(12) United States Patent
Cone (10) Patent No.: US 11,328,374 B1
(45) Date of Patent: May 10, 2022

(54) SYSTEM AND PROCESS FOR CONVERTING AN UNBRANDED VIRTUAL TOUR OF A REAL ESTATE LISTING INTO A BRANDED VIRTUAL TOUR OF THE REAL ESTATE LISTING ENHANCED WITH BRANDING, CONTACT, AND MARKETING INFORMATION

(71) Applicant: Kristopher R Cone, Sammamish, WA (US)

(72) Inventor: Kristopher R Cone, Sammamish, WA (US)

( * ) Notice: Subject to any disclaimer, the term of this patent is extended or adjusted under 35 U.S.C. 154(b) by 170 days.

(21) Appl. No.: 16/669,332

(22) Filed: Oct. 30, 2019

Related U.S. Application Data (60) Provisional application No. 62/752,771, filed on Oct. 30, 2018.

(51) Int. Cl.
*G06Q 30/02* (2012.01)
*G06Q 50/06* (2012.01)
*G06Q 50/16* (2012.01)
*G06Q 30/06* (2012.01)
*G06F 3/01* (2006.01)
*G06F 3/04815* (2022.01)
*G06T 19/00* (2011.01)

(52) U.S. Cl.
CPC ............. *G06Q 50/16* (2013.01); *G06F 3/011* (2013.01); *G06F 3/017* (2013.01); *G06F 3/04815* (2013.01); *G06Q 30/02* (2013.01); *G06Q 30/0601* (2013.01); *G06T 19/006* (2013.01)

(58) Field of Classification Search
CPC .... G06Q 50/16; G06Q 30/02; G06Q 30/0601; G06F 3/017; G06F 3/04815; G06F 3/011; G06T 19/006
See application file for complete search history.

(56) References Cited

U.S. PATENT DOCUMENTS

2016/0335681 A1* 11/2016 Swanson ............. G06F 16/9535

FOREIGN PATENT DOCUMENTS

| CA | 2801512 A1 * | 7/2013 | ......... G06F 3/04815 |
| WO | WO-2014089447 A1 * | 6/2014 | ......... G06Q 30/0623 |
| WO | WO-2016179524 A1 * | 11/2016 | ..... H04N 21/234309 |

OTHER PUBLICATIONS

Wang "Design and Implementation of Three-Dimensional Virtual Tour Guide Training System Based on Unity3D" ISBN (Electronic): 978-1-7281-3681-3 Digital Object Identifier: 10.1109/CISCE.2019. 00054 Conference Acronym: CISCE IEEE Conference Paper Published in: 2019.*

* cited by examiner

Primary Examiner — Raquel Alvarez (57) ABSTRACT

A software-implemented process to convert an unbranded virtual tour for a real estate listing into a branded virtual tour that displays the branding and contact information of the marketing agent, a lead capture form to contact the agent and adds any other marketing content or information for display to the end consumer is disclosed.

10 Claims, 6 Drawing Sheets

SYSTEM AND PROCESS FOR CONVERTING AN UNBRANDED VIRTUAL TOUR OF A REAL ESTATE LISTING INTO A BRANDED VIRTUAL TOUR OF THE REAL ESTATE LISTING ENHANCED WITH BRANDING, CONTACT, AND MARKETING INFORMATION

CLAIM OF BENEFIT TO PRIOR APPLICATION

This application claims benefit to U.S. Provisional Patent Application 62/752,771, entitled "A method and process to convert an unbranded advertisement website page for a product, service or listing, accessed from a referring website employing the secure socket layer protocol, into a branded advertisement website page hosted using the secure socket layer protocol and the corresponding lead capture system, with or without associated product or service offers, enabled based on a browser's interaction with the branded advertisement website page," filed Oct. 30, 2018. The U.S. Provisional Patent Application 62/752,771 is incorporated herein by reference.

BACKGROUND

Embodiments of the invention described in this specification relate generally to virtual tour creation systems, and more particularly, to a process for converting an unbranded virtual tour of a real estate listing into a branded virtual tour of the real estate listing enhanced with branding, contact, and marketing information and a system that converts an unbranded virtual tour of a real estate listing into a branded virtual tour of the real estate listing enhanced with branding of a marketing agent, contact information of the marketing agent, marketing information, and a lead capture form to contact the marketing agent.

Real estate agents typically use a multiple listing service ("MLS") to input listings of properties for sale or lease. They often hire photographers or virtual tour companies to visit the property and take photos, create digital floor plans, and/or create videos. This content is used to build the property listing in the MLS. A virtual tour, or property specific website, may be created by the agent, the virtual tour company, the agent's website vendor, or through an automated process. Regardless of how it is created, any virtual tour or single property website or page link created is also added as additional media for the listing beyond the traditional text and photographs of the property. The MLS typically requires an unbranded version of the virtual tour to be input into the MLS. This unbranded version has no listing agent branding or contact information because of the desire to protect the buy-side agent who might share the real estate listing with their client, the potential buyer. The theory behind this requirement is this unbranded tour makes it harder for a buyer to reach out to the listing agent directly.

The MLS listing is typically the original source of the property data used for distributing the listing information to other websites, including public listing websites (such as Zillow, Trulia, Realtor.com, Homes.com, etc.) and brokerage or agent websites (such as remax.com, Redfin.com, coldwellbanker.com, individual agent websites, etc.). The same listing information is passed from the MLS to all of these sites, including the unbranded virtual tour link through data feeds.

Most consumers visit the larger public listing sites. In fact, about 96% of the top ten sites are concentrated into five sites, namely, Zillow, Realtor.com, Trulia, Redfin, and Homes-.com. The virtual tour link on these sites is the unbranded version since the original data source is the MLS. This prevents agent information from being displayed on the virtual tour and, therefore, the agent's exposure to consumers is minimized because the agent's brand and contact information is not visible. Similarly, these agents have fewer opportunities for organic leads, and this forces them to have to pay for leads on the larger public listing websites.

The problems with other virtual tour systems is there is no intelligence employed to determine what website a user came from when they clicked the virtual tour URL or property website page. In addition, many virtual tours do not employ secure certificates or use the HTTPS protocol. Therefore, they do not or cannot display the branded virtual tour and the agent exposure is minimized, while potential lead capture opportunities are lost and the agent ends up having to pay money for leads.

Therefore, what is needed is a way to enable unbranded virtual tours to by viewed as branded virtual tours, complete with agent branding and contact information and with the potential to engage no cost opportunities for lead capturing.

BRIEF DESCRIPTION

A novel process for converting an unbranded virtual tour of a real estate listing into a branded virtual tour of the real estate listing enhanced with branding, contact, and marketing information and a novel system that converts an unbranded virtual tour of a real estate listing into a branded virtual tour of the real estate listing enhanced with branding of a marketing agent, contact information of the marketing agent, marketing information, and a lead capture form to contact the marketing agent are disclosed. In some embodiments, the system and process for converting an unbranded virtual tour of a real estate listing into a branded virtual tour of the real estate listing enhanced with branding, contact, and marketing information enables unbranded to branded conversion automatically when a user clicks its proprietary virtual tour link. In some embodiments, automatic unbranded to branded conversion happens by the system and process for converting an unbranded virtual tour of a real estate listing into a branded virtual tour of the real estate listing enhanced with branding, contact, and marketing information when (i) the destination website (the virtual tour website) uses the HTTPS protocol to display its content, (ii) the server of the virtual tour website employs intelligence to recognize the referring website name as passed via the HTTP referrer header field when both websites use the HTTPS protocol, and (iii) the server of the virtual tour website uses an algorithm to determine if a branded virtual tour link is allowed to be seen by the end user, based on the referring website name and associated URL or website address.

In some embodiments, the process for converting an unbranded virtual tour of a real estate listing into a branded virtual tour of the real estate listing enhanced with branding, contact, and marketing information includes a plurality of steps comprising (i) receiving profile data input from a computing device of a real estate agent for a virtual tour associated with a property for sale, (ii) configuring a default website list that includes named website list entries associated with popular real estate websites which support secure hypertext transfer protocol (HTTPS) for links to property websites and the virtual tour associated with the property for sale, (iii) receiving website profile data input including one or more other websites not in the default website list from the computing device of the real estate agent, (iv) receiving an unbranded virtual tour link to a multiple listing service (MLS) site for distribution to other websites for viewing by anyone, (v) distributing the unbranded virtual tour link to multiple real estate listing websites that display real estate listings as part of an MLS data feed and which include popular real estate websites in the default website list, (vi) capturing referring website identity information from an HTTPS request that is triggered based on a user selection of the unbranded virtual tour link at a particular website, (vii) reading the default website list and the website profile data to determine whether the referring website identity information corresponds to any website configured to convert the unbranded virtual tour into a branded virtual tour, (viii) converting the unbranded virtual tour into the branded virtual tour when the referring website identity corresponds to a website configured to convert the unbranded virtual tour into the branded virtual tour, (ix) displaying the branded virtual tour with agent branding and contract information, and (x) optionally displaying a lead capture input form or a lead capture button, which when selected, triggers visual display of the lead capture input form.

The preceding Summary is intended to serve as a brief introduction to some embodiments of the invention. It is not meant to be an introduction or overview of all inventive subject matter disclosed in this specification. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, and Drawings is needed. Moreover, the claimed subject matters are not to be limited by the illustrative details in the Summary, Detailed Description, and Drawings, but rather are to be defined by the appended claims, because the claimed subject matter can be embodied in other specific forms without departing from the spirit of the subject matter.

BRIEF DESCRIPTION OF THE DRAWINGS

Having described the invention in general terms, reference is now made to the accompanying drawings, which are not necessarily drawn to scale, and wherein.

DETAILED DESCRIPTION

In the following detailed description of the invention, numerous details, examples, and embodiments of the invention are described. In many of these details, examples, and descriptions, reference is made to Hypertext Transfer Protocol Secure (HTTPS), which is an extension of the Hypertext Transfer Protocol (HTTP). HTTPS is used for secure communication over a computer network, and is widely used on the Internet. In HTTPS, the communication protocol is encrypted using Transport Layer Security (TLS), or, formerly, its predecessor, Secure Sockets Layer (SSL). The protocol is therefore also often referred to as HTTP over TLS, or HTTP over SSL. Thus, while the common practice today is to use HTTPS, the invention is not limited to only HTTPS as this could change in the future to a new protocol that secures website to website communication. Accordingly, for purposes of this disclosure, the invention is intended to be extended to any such future manner of securing website to website communication. Furthermore, HTTPS provides referring website information in the "HTTP referrer header field" as defined in the HTTP standard. While the term "referrer" in "HTTP referrer header field" is not spelled in the conventional manner "referrer", the HTTP standard uses this unconventional spelling "referrer". In this specification, the terms "referrer" and "referrer" are used interchangeably with equivalent meanings. Thus, reference to the "HTTP referrer header field" in the descriptions that follow may use either the unconventional "referrer" spelling of the term or the conventional "referrer" spelling of the term.

Another term widely referenced throughout this specification is "virtual tour". In this disclosure, the term "virtual tour" is broadly understood to include similar terminology, such as "virtual media link", "property website", and "single property website", among others. Thus, the use in this specification of the term "virtual tour" refers collectively and individually to "virtual tour", "virtual media link", "property website", and "single property website". However, it is understood that such terms may be related to other, similar terms that are added to the lexicon of the relevant art in the future. Thus, it will be clear and apparent to one skilled in the art that the invention is not limited to the embodiments set forth and that the invention can be adapted for any of several applications.

Some embodiments of the invention include a novel process for converting an unbranded virtual tour of a real estate listing into a branded virtual tour of the real estate listing enhanced with branding, contact, and marketing information and a novel system that converts an unbranded virtual tour of a real estate listing into a branded virtual tour of the real estate listing enhanced with branding of a marketing agent, contact information of the marketing agent, marketing information, and a lead capture form to contact the marketing agent.

In some embodiments, the system and process for converting an unbranded virtual tour of a real estate listing into a branded virtual tour of the real estate listing enhanced with branding, contact, and marketing information enables unbranded to branded conversion automatically when a user clicks its proprietary virtual tour link. In some embodiments, automatic unbranded to branded conversion happens by the system and process for converting an unbranded virtual tour of a real estate listing into a branded virtual tour of the real estate listing enhanced with branding, contact, and marketing information when (i) the destination website (the virtual tour website) uses the HTTPS protocol to display its content, (ii) the server of the virtual tour website employs intelligence to recognize the referring website name as passed via the HTTP referrer header field when both websites use the HTTPS protocol, and (iii) the server of the virtual tour website uses an algorithm to determine if a branded virtual tour link is allowed to be seen by the end user, based on the referring website name and associated URL or website address.

As stated above, real estate agents typically use the MLS to input listings of properties for sale or lease. The content input for the MLS listing typically includes a virtual tour or a property-specific website created by the agent, a virtual tour company, the real estate agent's company, or through an automated process. However, the MLS requires branding information to be absent, rendering any virtual tour as an unbranded version of the virtual tour, specifically lacking all listing agent branding and contact information to protect the buy-side agent and their potential buyer. The MLS listing is typically the original source of the property data used for distributing the listing information to other websites, including public listing websites and brokerage or agent websites. The same listing information is passed from the MLS to all of these sites, including the unbranded virtual tour link. Since most consumers visit larger public listing sites, the virtual tour links of MLS listed properties via these sites is typically the unbranded virtual tour versions, thereby minimizing an agent's exposure to consumers and affording less opportunities for organic leads. Existing conventional virtual tour systems are an insufficient option. One problem is that these conventional systems do not employ any intelligence to determine what website a user came from when they clicked the virtual tour URL or website page. In addition, many virtual tours do not use the HTTPS protocol, preventing the HTTP referrer header field from being passed to the destination site. Embodiments of the system and process for converting an unbranded virtual tour of a real estate listing into a branded virtual tour of the real estate listing enhanced with branding, contact, and marketing information described in this specification solve such problems by automatically converting the unbranded virtual tour linked and displayed on the public listing websites, and other select sites (including the agent's company/brokerage website or their personal website or blog), into the branded version of the virtual tour. The conversion from unbranded virtual tour to branded virtual tour happens automatically when a user on one of the websites clicks the virtual tour link. The system and process for converting an unbranded virtual tour of a real estate listing into a branded virtual tour of the real estate listing enhanced with branding, contact, and marketing information detects the referring website as passed from the HTTP referrer header field and based on rules to determine if the branded virtual tour would be allowed, or not, it displays the branded version to the end consumer where appropriate, showing the listing agent branding, contact information and a lead capture form. Other information, special offers or advertising may also be displayed on the branded virtual tour.

Embodiments of the system and process for converting an unbranded virtual tour of a real estate listing into a branded virtual tour of the real estate listing enhanced with branding, contact, and marketing information described in this specification differ from and improve upon currently existing options. In particular, existing conventional virtual tour systems do not or cannot display a branded virtual tour and the agent associated with the listing for the virtual tour loses exposure and potential lead capture opportunities. One reason is that existing conventional virtual tour systems do not incorporate intelligence in their systems to determine a website of origin (the referring website) that initiated the request to display the virtual tour website. In addition, many virtual tours do not use secure certificates and the HTTPS protocol. However, most property listing websites and real estate brokerage sites do use the HTTPS protocol. By the standard's design, referring website data (the HTTP referrer header field data) is not passed from a secure HTTPS website to unsecured HTTP websites (websites that do not employ the use of the HTTPS protocol). Therefore, there is no way to derive the referring website information via the HTTP referrer header field for websites that do not use the HTTPS protocol (or any future variant of such website to website secure protocol). As such, information about a referring website that is directing website traffic to the unsecured virtual tour link is not available, and thus, there is no way to know if the end user could be allowed to view a branded virtual tour, which prevents any kind of branding conversion of the virtual tour from unbranded to branded.

In addition, some embodiments of the system and process for converting an unbranded virtual tour of a real estate listing into a branded virtual tour of the real estate listing enhanced with branding, contact, and marketing information improve upon the currently existing options. Specifically none of the existing conventional virtual tour systems provide an automated conversion of a virtual tour from unbranded to branded. By contrast, the system and process for converting an unbranded virtual tour of a real estate listing into a branded virtual tour of the real estate listing enhanced with branding, contact, and marketing information of the present disclosure employs three processes to enable the unbranded to branded conversion automatically when a user clicks its proprietary virtual tour link. This automatic unbranded to branded conversion happens when (i) the destination website (the virtual tour website) uses the HTTPS protocol to display its content, (ii) the server of the virtual tour website employs intelligence to recognize the referring website name as passed via the HTTP referrer header field when both websites use the HTTPS protocol, and (iii) the server of the virtual tour website uses an algorithm to determine if a branded virtual tour link is allowed to be seen by the end user, based on the referring website name and associated URL or website address.

The system and process for converting an unbranded virtual tour of a real estate listing into a branded virtual tour of the real estate listing enhanced with branding, contact, and marketing information of the present disclosure may be comprised of the following steps and elements. This list of possible constituent steps and elements is intended to be exemplary only and it is not intended that this list be used to limit the system and process for converting an unbranded virtual tour of a real estate listing into a branded virtual tour of the real estate listing enhanced with branding, contact, and marketing information of the present application to just these steps or elements. Persons having ordinary skill in the art relevant to the present disclosure may understand there to be equivalent steps or elements that may be substituted within the present disclosure without changing the essential function or operation of the system and process for converting an unbranded virtual tour of a real estate listing into a branded virtual tour of the real estate listing enhanced with branding, contact, and marketing information.

Step 1: The real estate agent (or other user) enters profile information, such as name, phone numbers, website address, email address and social media profiles. Profile information could also be automatically entered, such as by a data feed the pre-populates the information. The profile information includes base user contact information (name, phone number(s), email address(es), website(s), logo, etc.) which is required to enable lead capture and show the real estate agent branding. The profile information is usually entered at the time of registration for the site or after, via an edit function using a computer or mobile device with Internet access, for editing or updating at any time.

Step 2: The system and process for converting an unbranded virtual tour of a real estate listing into a branded virtual tour of the real estate listing enhanced with branding, contact, and marketing information is configured, via database entries, with a system default list for websites in which the unbranded virtual tour website is to be converted to the branded virtual tour. Examples of websites in the system default list include, without limitation, Zillow, Trulia, Realtor.com, Redfin, eBay, Craigslist, Yahoo Real Estate, Homes.com, and Facebook.com. Other websites could be added based on the listing type of the tour/advertisement. In some embodiments, the websites in the system default list are the most popular real estate websites which are more likely than other sites to drive most of the lead opportunities. In this way, the system and process for converting an unbranded virtual tour of a real estate listing into a branded virtual tour of the real estate listing enhanced with branding, contact, and marketing information automatically handles the websites in the system default list. The system default list may be edited to include other websites or to exclude one or more of the websites in the system default list. In all cases, however, the system and process for converting an unbranded virtual tour of a real estate listing into a branded virtual tour of the real estate listing enhanced with branding, contact, and marketing information will only work on sites that use a secure transfer protocol, such as those that employ HTTPS, because the HTTP referrer header field is only passed from HTTPS websites to other HTTPS websites.

Step 3: The real estate agent (or other user) configures or edits their profile using a computer or mobile device to include other websites where they would like the conversion to occur, such as their blog, personal website, or their company website. This allows the real estate agent to define the website profiles of sites at which to employ the branded virtual tour, in addition to those popular real estate search sites defined in Step 2. In some embodiments, the business website address of the user as defined in Step 1 is automatically carried over to Step 3. In some embodiments, the user can enter in any other website addresses where they would like the branded virtual tour activated.

Step 4: The system and process for converting an unbranded virtual tour of a real estate listing into a branded virtual tour of the real estate listing enhanced with branding, contact, and marketing information is optionally configured to feed leads into the user's or company's lead capture system. Specifically, the system and process for converting an unbranded virtual tour of a real estate listing into a branded virtual tour of the real estate listing enhanced with branding, contact, and marketing information of some embodiments is configured to send any leads captured in Step 10, described below, to the user's or user's company customer relationship management (CRM) system or other lead capture system.

Step 5: The virtual tour website URL is secured with a digital certificate using the HTTPS protocol. In some embodiments, a website administrator of the virtual tour system configures a secure digital certificate in order to employ the use of the HTTPS protocol and enable secure encrypted communications between the virtual tour website page and any referring websites. This certificate may use SSL (secure socket layer) or TLS (transport layer security) or future secure transfer protocols. This is essential to obtain the referring website information, the HTTP referrer header field, to determine the source of the website that was used when the unbranded virtual tour was initially clicked.

Step 6: The real estate agent or other user inputs the unbranded virtual tour URL (web link) into the applicable MLS system as a virtual tour, a virtual media link, or a single property website. This may also be automated by a virtual tour system or other system. The unbranded virtual tour URL typically must be in the MLS in order for it to be distributed to other websites for viewing by anyone. Due to MLS rules, the virtual tour link typically must be the unbranded (no agent branding or information) version.

Step 7: The unbranded virtual tour is distributed to numerous websites that display real estate listings as part of the MLS data feed. This typically happens automatically, but it could be done via a manual process, including direct input of the unbranded virtual tour URL by the real estate agent into a specific website. This step is required in order to get the unbranded virtual tour displayed as a clickable link on the most popular websites that most consumers use to view real estate listings, such as Zillow or Realtor.com, or any of those sites listed in the system default list for websites, described above at Step 2 and Step 3.

Step 8: A website user (potential buyer) clicks on the unbranded virtual tour link on any real estate website listing page. The virtual tour is typically displayed as text, such as "Virtual Tour," but some websites show it as a button with text such as "tour." Regardless, when the user clicks the link or button for the property website, it takes them to the virtual tour.

Step 9: The server of the virtual tour system recognizes the referring website of the website user by reading the HTTP referrer header field, looks up that website in a database and displays the branded virtual tour if the referring website is allowed to show a branded version of the virtual tour based on business rules established by the virtual tour system.

Step 10: The website user uses their computer or mobile device to contact the listing agent, either manually using the agent contact information, or by completing the lead capture form on the branded virtual tour. The website user can then ask questions, inquire about more information/aspects of the listed property associated with the virtual tour, etc.

The various steps and elements of the system and process for converting an unbranded virtual tour of a real estate listing into a branded virtual tour of the real estate listing enhanced with branding, contact, and marketing information of the present disclosure may be related in the following example, described next by reference to FIG. 1. It is not intended to limit the scope or nature of the relationships between the various elements and the following examples are presented as illustrative examples only.

Figure 1:
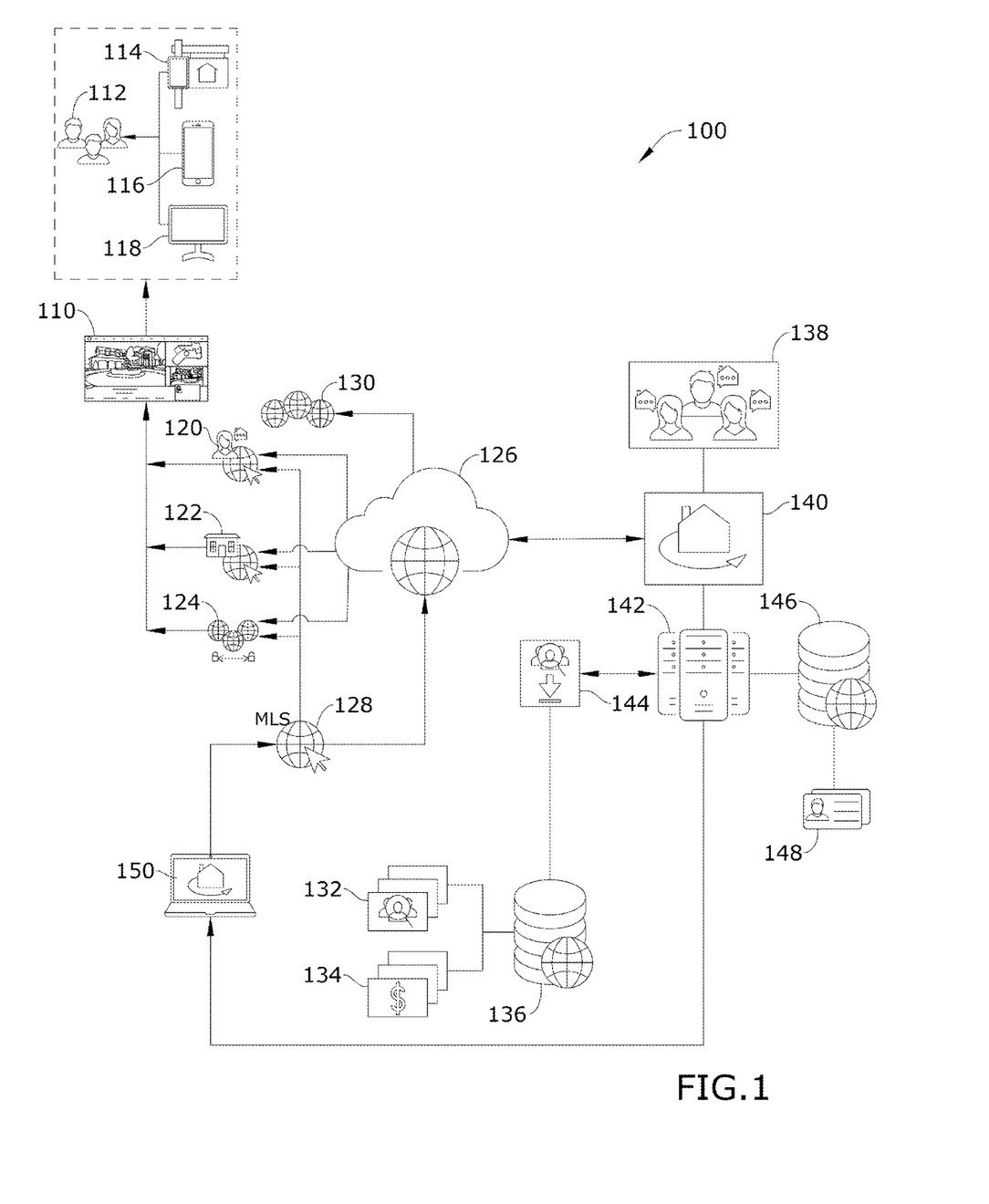
FIG. 1 conceptually illustrates a network architecture of a web-based real estate listing virtual tour conversion system of some embodiments that converts an unbranded virtual tour of a real estate listing into a branded virtual tour of the real estate listing enhanced with branding of a marketing agent, contact information of the marketing agent, marketing information, and a lead capture form to contact the marketing agent.

By way of example, FIG. 1 conceptually illustrates a network architecture of a web-based real estate listing virtual tour conversion system 100 that converts an unbranded virtual tour of a real estate listing into a branded virtual tour of the real estate listing enhanced with branding of a marketing agent, contact information of the marketing agent, marketing information, and a lead capture form to contact the marketing agent. As shown in this figure, the web-based real estate listing virtual tour conversion system 100 includes a branded virtual tour 110, potential buyers 112, a physical tour at a physical geospatial location of a property 114, a mobile device displaying a post-conversion branded virtual tour of the property 116, a computer displaying a post-conversion branded virtual tour of the property 118, an agent website 120, a company website 122, several secure portal public search websites 124, a public network 126 ("the internet 126"), multiple listing service websites 128 ("MLS websites 128"), several competitor websites 130, lead data 132, offers data 134, a first cloud database 136, agents 138, a branded virtual tour system 140, a branded virtual tour server 142, a lead capture system 144, a second cloud database 146, profile and listing data 148, and an unbranded virtual tour 150.

A branded virtual tour access group encompasses (shown as a dashed-line box) an exemplary group of potential buyers 112 (or "consumers"), a physical tour at a physical geospatial location of a property 114 that is for sale and listed in the MLS, a mobile device displaying a post-conversion branded virtual tour of the property 116 which is representative of one or more mobile devices used/owned/operated by any one or more of the potential buyers 112 to view the branded virtual tour 110 of the property, and a computer displaying a post-conversion branded virtual tour of the property 118 which is representative of one or more computing devices, such as desktop computers, laptop computers, tablet computing devices, etc., used/owned/operated by any one or more of the potential buyers 112 to view the branded virtual tour 110.

The web-based real estate listing virtual tour conversion system 100 shown in this figure schematically demonstrates a flow of information and action that can arise when converting an unbranded virtual tour 150 of a property into a branded virtual tour 110 of the property via the branded virtual tour system 140. Specifically, a user from among agents 138 (in this example referred to as "user agent 138") starts by inputting profile information into the branded virtual tour system 140. The profile information includes various branding and contact data about the user agent 138 including, for example, name, phone number(s), website address, email address, and social media profile(s). The user agent 138 enters the profile information and listing data when connected to the branded virtual tour system 140, via mobile or non-mobile computing device, and is thereby connected to the branded virtual tour server 142, which processes the profile information and listing data and stores relevant profile and listing data 148 in the second cloud database 146. The branded virtual tour server 142 produces the branded virtual tour 110 which the branded virtual tour system 140 provisions to sites over the Internet 126, while the branded virtual tour server 142 itself outputs the unbranded virtual tour 150. Specifically, the branded virtual tour server 142 produces the unbranded virtual tour 150 for linked publication in one or more of the MLS websites 128 to which one or more competitor websites 130 are also linked. The branded virtual tour system 140 connects to MLS websites 128 over the Internet 126.

The several secure portal public search websites 124 are designated in a system default list of websites. All of the secure portal public search websites 124 as well as the buyer 112 side devices (e.g., the mobile device displaying a post-conversion branded virtual tour of the property 116 and/or the computer displaying a post-conversion branded virtual tour of the property 118) are configured for secure data transfer via HTTPS (SSL/TLS). In this way, the HTTP referrer header field can be read to determining the referring website. The system default list of websites is loaded by the branded virtual tour server 142 such that the unbranded virtual tour 150 can be converted to the branded virtual tour 110 when accessed via link through any of the secure portal public search websites 124 by a permitted user accessing the link via HTTPS (SSL/TLS). The several secure portal public search websites 124 are typically the most popular real estate websites. Examples of popular sites included in the system default list include, without limitation, Zillow, Trulia, Realtor.com, Redfin, eBay, Craigslist, Yahoo Real Estate, Homes.com, Facebook.com, but other websites could be added. In addition, the user agent 138 can configure or edit their profile to include other websites in which unbranded to branded virtual tour conversion can occur, such as their blog, personal website, or their company website, etc. Two of the websites in the sites that are configured for unbranded to branded virtual tour conversion include the agent website 120 and the company website 122 of the user agent 138.

In some embodiments, the web-based real estate listing virtual tour conversion system 100 is configured to feed leads into a lead capture system or customer relationship management (CRM) system of the user agent 138 or the company of the user agent 138. As shown in this figure, the lead capturing aspect of the web-based real estate listing virtual tour conversion system 100 includes lead data 132, offers data 134, the first cloud database 136, and the lead capture system 144. In some embodiments, the web-based real estate listing virtual tour conversion system 100 is configured to engage users via one or more soft or hard lead capture features accessed through the branded virtual tour 110 of the property as provided by the branded virtual tour system 140 via the branded virtual tour server 142. In this way, lead data 132 and offers data 134 is stored in the first cloud database 136 and made available to the lead capture system 144.

The system and process for converting an unbranded virtual tour of a real estate listing into a branded virtual tour of the real estate listing enhanced with branding, contact, and marketing information of the present disclosure generally works by converting the unbranded virtual tour into the branded virtual tour, which visually outputs branding and contact information of the real estate agent, and enables a lead capture form to capture contact and buyer interest information from a potential buyer or seller from within the virtual tour based on the referring website at which the potential buyer or seller ("lead") clicked on the virtual tour link. Steps 2 and 3 defines the logic for determining whether the referring website can display the branded virtual tour. No conversion occurs when the referring website is not on either the system defined list (Step 2) or the real estate agent (user) list (Step 3), resulting in the unbranded virtual tour being displayed. This is essential to maintain adherence to rules set forth by local MLS organizations or real estate associations. Violating such rules can result in a real estate agent being fined, or in some cases, losing their license.

A key requirement of the system and process for converting an unbranded virtual tour of a real estate listing into a branded virtual tour of the real estate listing enhanced with branding, contact, and marketing information is both websites (referrer site and the destination virtual tour page) must be secure using HTTPS. Without it, the HTTP referrer header field, with the referring website information, is not passed to the servers of the virtual tour system. By operation, the referring website information is not passed from a website using HTTPS to a website not using HTTPS (an unsecured HTTP website). Therefore, the system and process for converting an unbranded virtual tour of a real estate listing into a branded virtual tour of the real estate listing enhanced with branding, contact, and marketing information determines whether both the referring website and the destination website embedded in the virtual tour link are using the secure hypertext transfer protocol. When both websites are affirmatively employing HTTPS as their transport protocol, then the system and process for converting an unbranded virtual tour of a real estate listing into a branded virtual tour of the real estate listing enhanced with branding, contact, and marketing information uses the referring website data and employs logic to ascertain whether the user that clicked on the referring website is permitted see the branded virtual tour. In some embodiments, the user is permitted to see the branded virtual tour when the referring website is listed in the "branding OK" list of the virtual tour system's server. Thus, when the user is determined to be permitted to see the branded virtual tour, the system and process for converting an unbranded virtual tour of a real estate listing into a branded virtual tour of the real estate listing enhanced with branding, contact, and marketing information enables the branded virtual tour to be displayed. Once the branding is displayed, any user of the referring website can see the real estate agent branding and contact information, including, for example, logo, agent profile photo, phone number and/or email address, and the lead capture form is enabled for active display. In some embodiments, the lead capture form is enabled for active display, but not displayed until triggered. In some embodiments, the lead capture form is triggered via a triggering mechanism. In some embodiments, the triggering mechanism is by user action, such as by the user selecting a lead capture form tool, menu option, or other icon/graphical element within the branded virtual tour. In some embodiments, once the branding is displayed, other external links or special offers can be displayed.

In some embodiments, after determining that a branded virtual tour is allowed and can be displayed, the system and process for converting an unbranded virtual tour of a real estate listing into a branded virtual tour of the real estate listing enhanced with branding, contact, and marketing information has further presentation options that allow the display of the branded virtual tour to be personalized according to a type of user determined to be viewing the tour website. In some embodiments, upon determining that a branded virtual tour can be displayed, the system and process for converting an unbranded virtual tour of a real estate listing into a branded virtual tour of the real estate listing enhanced with branding, contact, and marketing information can show a version of the branded virtual tour based on the website accessed, the profile of the user viewing the branded virtual tour or any other targeting parameter. For example, upon determining that the user is a buyer (potential buyer, consumer, etc.), the system and process for converting an unbranded virtual tour of a real estate listing into a branded virtual tour of the real estate listing enhanced with branding, contact, and marketing information could show additional information more suitable for targeting a buyer, potential buyer, consumer, etc. In contrast, when the user is identified as a seller, or an agent of a seller, the system and process for converting an unbranded virtual tour of a real estate listing into a branded virtual tour of the real estate listing enhanced with branding, contact, and marketing information could show different information (or some of the same information with other, different information) that is more suitable for targeting a seller or an agent of a seller. Essentially, the system and process for converting an unbranded virtual tour of a real estate listing into a branded virtual tour of the real estate listing enhanced with branding, contact, and marketing information can coordinate appropriate information to display in ways which would be more effective or which would resonate more with the user, whether a buyer or a seller, or any other target type of user, as there are an unlimited number of potential targeting mechanisms that could "personalize" the branded virtual tour experience.

The system and process for converting an unbranded virtual tour of a real estate listing into a branded virtual tour of the real estate listing enhanced with branding, contact, and marketing information uses logic to take the referring website information from the HTTP referrer header field passed between the two secure websites using HTTPS, the referring website (such as Zillow.com) and the destination website (the virtual tour) and looks up the referring website in a database. If the referring website matches a list of websites that will allow agent branding and contact information to be displayed, then the system and process for converting an unbranded virtual tour of a real estate listing into a branded virtual tour of the real estate listing enhanced with branding, contact, and marketing information automatically converts the unbranded virtual tour to a branded virtual tour. With this conversion, the real estate agent branding, logo, agent profile photo, and contact information are displayed, and a lead capture form is shown to the end website user (a potential buyer or seller).

Figure 2:
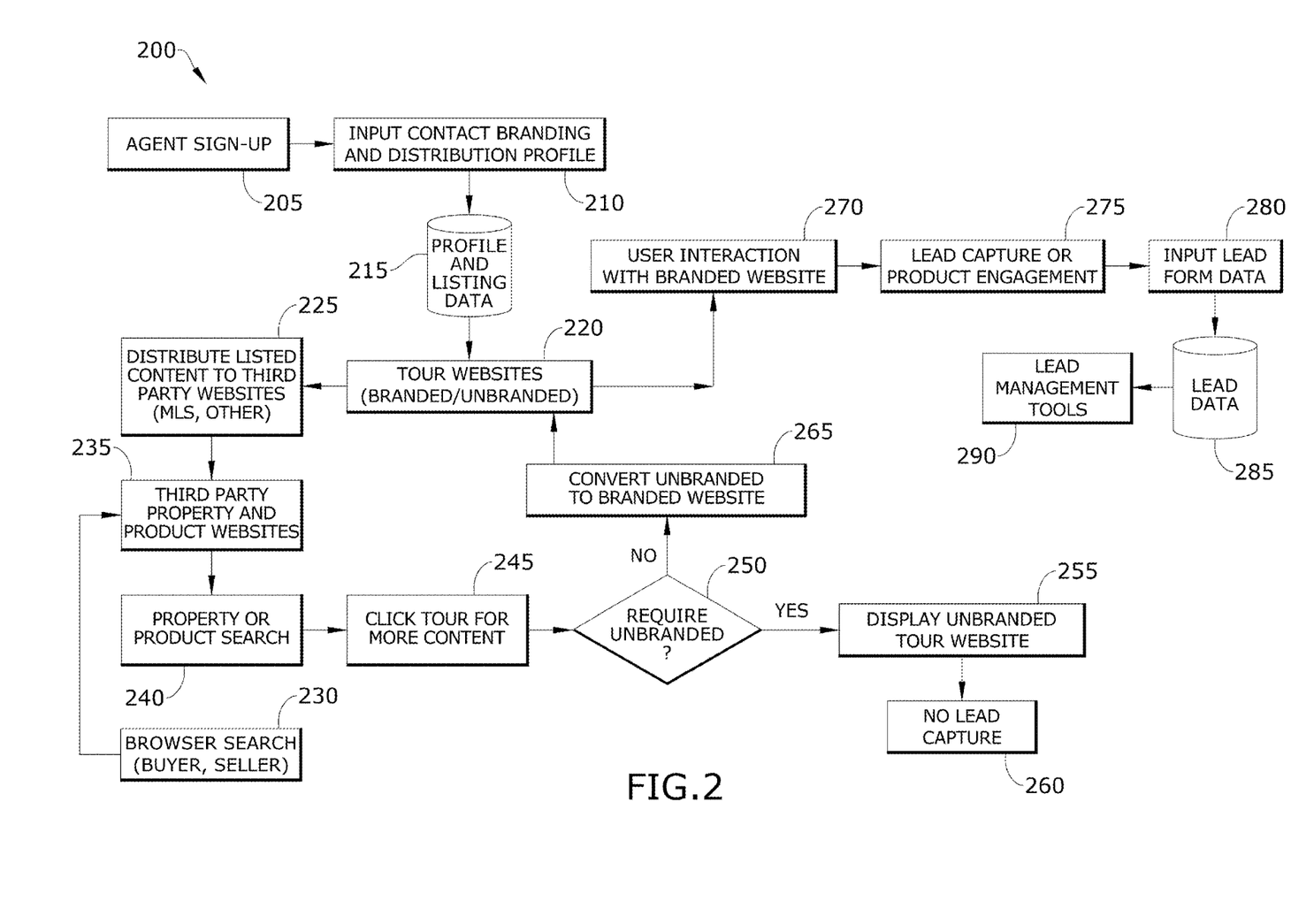
FIG. 2 conceptually illustrates a process for converting an unbranded virtual tour of a real estate listing into a branded virtual tour of the real estate listing enhanced with branding, contact, and marketing information in some embodiments.

By way of example, FIG. 2 conceptually illustrates a process for converting an unbranded virtual tour of a real estate listing into a branded virtual tour of the real estate listing enhanced with branding, contact, and marketing information 200. The process for converting an unbranded virtual tour of a real estate listing into a branded virtual tour of the real estate listing enhanced with branding, contact, and marketing information 200 includes starting points, namely, agent sign-up (at 205) and browser search (at 230). The starting point for browser search (at 230) is based on a scenario in which a buyer (or potential buyer, consumer, etc.) or a seller (or agent of seller) is performing a search via web browser and an agent (for a particular property) has already signed-up and created a virtual tour. However, the description of the process for converting an unbranded virtual tour of a real estate listing into a branded virtual tour of the real estate listing enhanced with branding, contact, and marketing information 200 in this example starts with agent sign-up (at 205). During agent-sign up (at 205) an agent user inputs profile information (at 210), such as described above. The entered profile information is then stored in a profile and listing data storage/database (at 215). From the profile and listing data (including photos, listing information, videos, as well as agent marketing and contact information) the process for converting an unbranded virtual tour of a real estate listing into a branded virtual tour of the real estate listing enhanced with branding, contact, and marketing information 200 takes place for the property being sold (at 220). Next, the process for converting an unbranded virtual tour of a real estate listing into a branded virtual tour of the real estate listing enhanced with branding, contact, and marketing information 200 distributes (at 225) an unbranded virtual tour of a real estate listing to third party websites which include links to the virtual tours, such as when a buyer does a search at one of the popular real estate websites.

Specifically, when the buyer or seller (or "user") performs a search (at 230), the user may access one of the third party property websites (at 235) with the distributed unbranded virtual tour content available via a link or button. Then the process for converting an unbranded virtual tour of a real estate listing into a branded virtual tour of the real estate listing enhanced with branding, contact, and marketing information 200 triggers an algorithm for determining branding eligibility (at 240) for property or product search. The search may yield results, such that when the user wants to view a specific property, they can also choose to click a virtual tour link (at 245) to access the virtual tour in either unbranded or branded form, depending on the transfer protocol used and permissions for the user. Next, the process for converting an unbranded virtual tour of a real estate listing into a branded virtual tour of the real estate listing enhanced with branding, contact, and marketing information 200 determines (at 250) whether to require the unbranded virtual tour to be displayed. To make this determination, the process for converting an unbranded virtual tour of a real estate listing into a branded virtual tour of the real estate listing enhanced with branding, contact, and marketing information 200 determines whether the referring website URL is secure (e.g., the website uses browser HTTPS to secure its site) and whether the referring website is able to pass the information in the HTTP referrer header field as part of the website data request. When both the referring site and the virtual tour linking site use the secure HTTPS protocol, then the HTTP referrer header field of the originating website is passed to the requesting website (the virtual tour website), and the process for converting an unbranded virtual tour of a real estate listing into a branded virtual tour of the real estate listing enhanced with branding, contact, and marketing information 200 is enabled, and employs an algorithm to determine whether the user is permitted to access the branded virtual tour. The process for converting an unbranded virtual tour of a real estate listing into a branded virtual tour of the real estate listing enhanced with branding, contact, and marketing information 200 of some embodiments displays the unbranded virtual tour web site (at 255) when one or both of these conditions is not met. In addition to not converting the unbranded virtual tour to include agent branding and contract information, the process for converting an unbranded virtual tour of a real estate listing into a branded virtual tour of the real estate listing enhanced with branding, contact, and marketing information 200 also does not provide lead capture features (at 260) with the unbranded virtual tour.

Referring back to the determination (at 250) of whether to require the unbranded virtual tour to be displayed, when the process for converting an unbranded virtual tour of a real estate listing into a branded virtual tour of the real estate listing enhanced with branding, contact, and marketing information 200 determines that HTTPS (SSL/TLS) is being used at both ends and that the user is permitted to view the branded virtual tour, then the unbranded virtual tour is converted (at 265) by the process for converting an unbranded virtual tour of a real estate listing into a branded virtual tour of the real estate listing enhanced with branding, contact, and marketing information 200 to the branded virtual tour, complete with agent branding and contact information, as well as other features, such as lead capture or other product aspects as configured. Then, by way of the virtual tour website (at 220), the branded virtual tour is accessed by a user interaction with the branded virtual tour website (at 270). From the branded virtual tour website, the user can access and initiate lead capture/product engagement (at 275). This feature is unique and important because it distinguishes from many MLS systems which prohibit any external links outside of the unbranded virtual tour. In some embodiments, the user selects a tool or graphical element from within the branded virtual tour interface to input lead form data (at 280). Such a tool or graphical element to access the input lead form is not available from the unbranded virtual tour. When lead data is input by the user in the input lead form, the process for converting an unbranded virtual tour of a real estate listing into a branded virtual tour of the real estate listing enhanced with branding, contact, and marketing information 200 stores the lead data (at 285) in a lead data CRM database or other database. Also, the process for converting an unbranded virtual tour of a real estate listing into a branded virtual tour of the real estate listing enhanced with branding, contact, and marketing information 200 provides access to other lead management tools (at 290) from within the branded virtual tour interface/site.

To make the system and process for converting an unbranded virtual tour of a real estate listing into a branded virtual tour of the real estate listing enhanced with branding, contact, and marketing information of the present disclosure, one may design, develop, code, and/or write computer programming logic and algorithms using common programming languages, protocols and tool-sets, including but not limited to PHP, HTML, CSS, mySQL and SSL. Any other programming languages and databases could be used to create the user interface to collect profile information, as defined above (e.g., at Step 1), establish the system defaults, as defined above (e.g., at Step 2), and enable configuration of the websites, as defined above (e.g., at Step 3). These programming languages are also used to direct lead capture information to the user's lead capture system, as defined above (e.g., at Step 4), or collect the lead from, as described above (e.g., at Step 10).

In some embodiments, the system and process for converting an unbranded virtual tour of a real estate listing into a branded virtual tour of the real estate listing enhanced with branding, contact, and marketing information needs the user's profile information (so that the branded virtual tour displays the real estate agent information and any leads can be emailed to such agent), as well as the list of websites where the branded virtual tour should be employed so that the user's contact information can be displayed within the branded virtual tour. When such user profile data is available, the conversion process can proceed almost instantaneously with the moment when a user clicks the unbranded virtual tour on a qualifying referring website. Essentially, the conversion process looks up that referring website and automatically converts the unbranded virtual tour to a branded virtual tour if it qualifies to display the agent branding. The HTTPS protocol on the referring website and on the virtual tour website page is required in order to pass the HTTP referrer header field of the referring website. The HTTP referrer header field is only passed from HTTPS to HTTPS-enabled websites. On the other hand, the HTTP referrer header field (and associated referring website data) is not passed from HTTPS to HTTP websites.

Other features, information, and prerequisites of the system and process for converting an unbranded virtual tour of a real estate listing into a branded virtual tour of the real estate listing enhanced with branding, contact, and marketing information include the secure website address, using the HTTPS protocol (SSL/TLS), of the virtual tour web page, the extraction of the HTTP referrer header field referring website information from the website browser when a user clicks on the unbranded virtual tour link on such referring website, and the conversion, by the system and process for converting an unbranded virtual tour of a real estate listing into a branded virtual tour of the real estate listing enhanced with branding, contact, and marketing information, of the unbranded virtual tour to a branded virtual tour based on a match of the referring website in the database of the virtual tour system. Another optional aspect of the system and process for converting an unbranded virtual tour of a real estate listing into a branded virtual tour of the real estate listing enhanced with branding, contact, and marketing information is that referring websites can display the branded virtual tour. This option is configurable by the virtual tour system website developers, or by the real estate agent in their profile.

To use the system and process for converting an unbranded virtual tour of a real estate listing into a branded virtual tour of the real estate listing enhanced with branding, contact, and marketing information of the present disclosure, the real estate agent first registers with the website to provide profile contact information (name, address, email, phone number, website address, etc.). The user next defines referring website profile data by entering in other websites, besides their default address and system default websites, where they would like the conversion of unbranded to branded virtual tour employed. This configuration can include turning off aspects and functionality of the system and process for converting an unbranded virtual tour of a real estate listing into a branded virtual tour of the real estate listing enhanced with branding, contact, and marketing information for certain websites that might otherwise be turned on by default. The user then determines the level of hard lead capture to employ on the advertisement web sites, including settings for frequency of visits, time on site, and user actions on the advertisement website.

When an agent gets a listing and creates a virtual tour (either with their own content or content from a hired professional), the virtual tour system produces a specific virtual tour link or URL that is unique to that property. Both a branded virtual tour version and an unbranded virtual tour version are created and provided to the agent.

Figure 3:
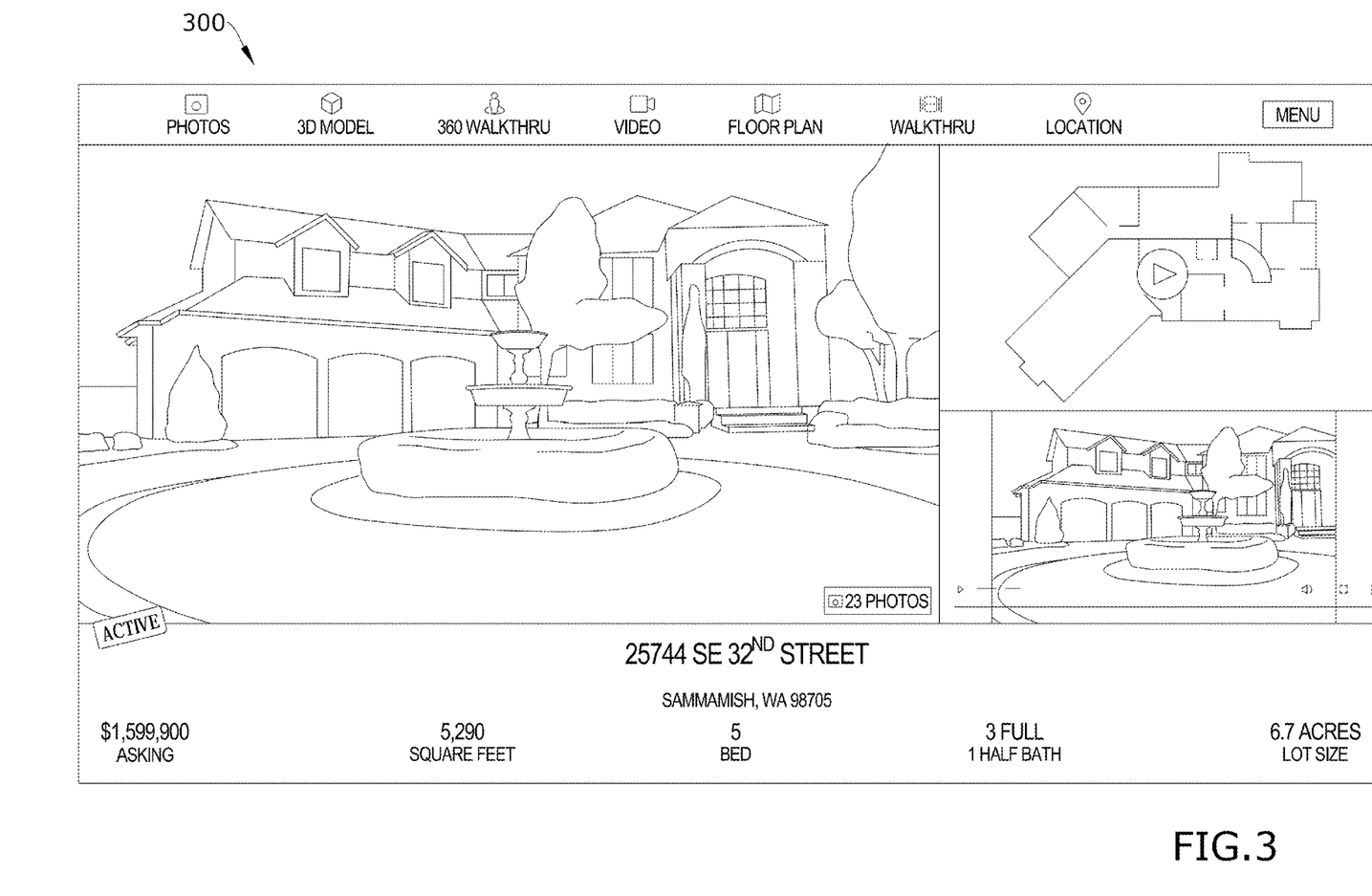
FIG. 3 conceptually illustrates a pre-conversion unbranded virtual tour of a real estate listing in some embodiments.

An example of an unbranded version of the virtual tour is illustrated in FIG. 3. Specifically, FIG. 3 conceptually illustrates an unbranded version of the virtual tour 300 associated with a real estate listing. The unbranded version of the virtual tour 300 is input into the local MLS, either manually by the agent or automatically by the virtual tour system, or another connected process. Once the listing is live, the photos, property information and virtual tour link to the unbranded version of the virtual tour 300 is distributed to hundreds of websites, one or more public search portals (e.g., Zillow or Realtor.com), and broker or agent websites. The unbranded version of the virtual tour 300 link is distributed such that when any user accesses any one of these web sites, and a user of the browser clicks on the link for the unbranded version of the virtual tour 300, the system and process for converting an unbranded virtual tour of a real estate listing into a branded virtual tour of the real estate listing enhanced with branding, contact, and marketing information automatically converts the unbranded version of the virtual tour 300 into the branded virtual tour on the public search portals and other select websites, as defined above (e.g., at Steps 2 and 3).

Figure 4:
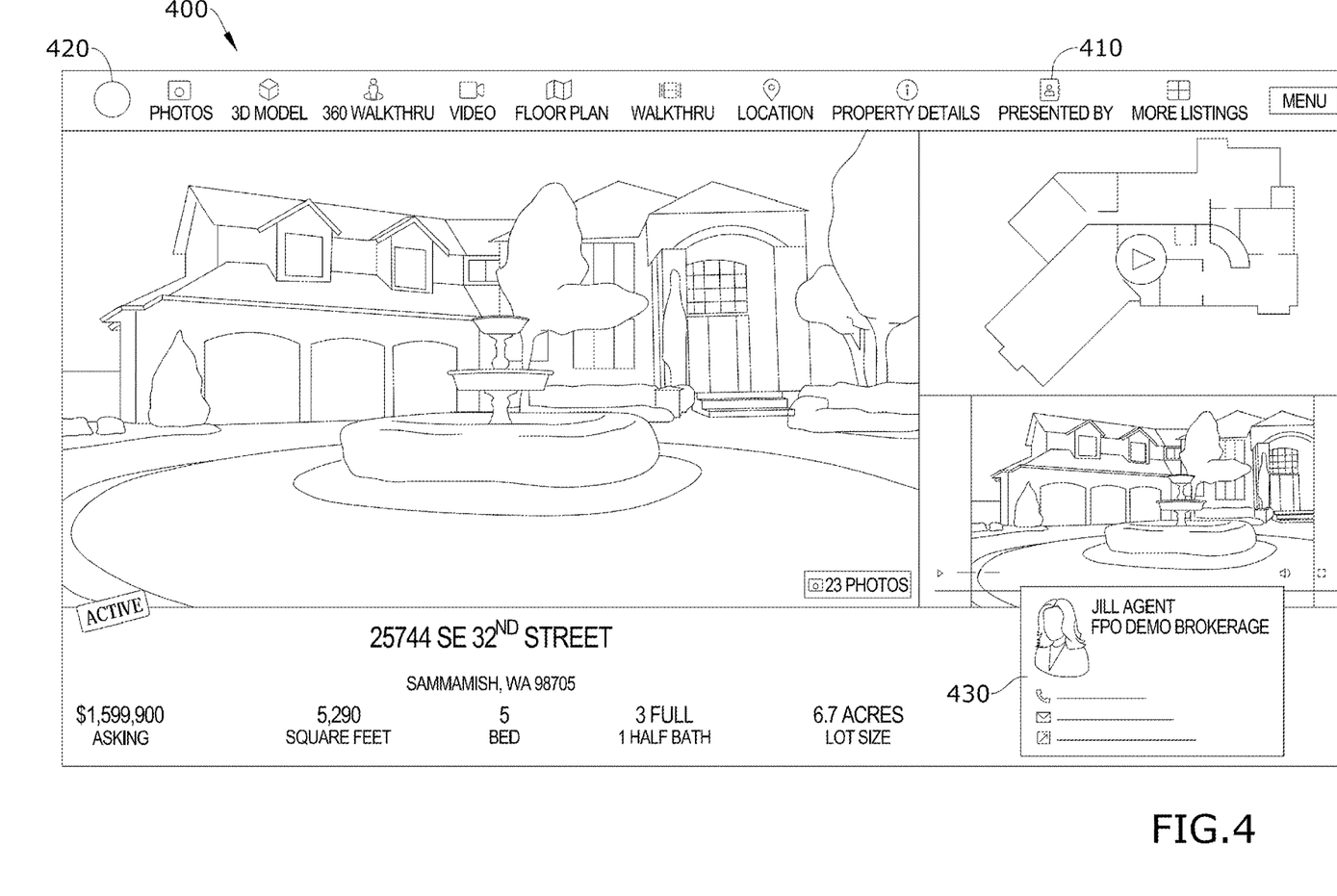
FIG. 4 conceptually illustrates a post-conversion branded virtual tour of a real estate listing in some embodiments.

By way of example, FIG. 4 conceptually illustrates a branded version of the virtual tour 400 of the real estate listing. The branded version of the virtual tour 400 (also referred to as "branded virtual tour 400") shown here is similar to the branded virtual tour 110 described above, by reference to FIG. 1. As shown in this figure, the branded version of the virtual tour 400 includes branding and contact information of the agent, which is automatically displayed to the user, and a lead capture form is enabled for active display. The user can access the lead capture form by selecting a lead capture form button 410 (or by typing it in directly to any lead form that may be displayed), added to the branded version of the virtual tour 400 (but not available in the unbranded version of the virtual tour 300). In addition, the branded version of the virtual tour 400 includes a user logo 420 for the agent, an optional profile logo, symbol, or picture, and other agent branding and contact information 430. In this way, whenever the user of the browser at the website wants information from the listing agent, the branded version of the virtual tour 400 automatically displays the needed information so that the user can call, text, or use the lead capture form (via the lead capture form button 410 or other lead form) to email the agent directly.

Figure 5:
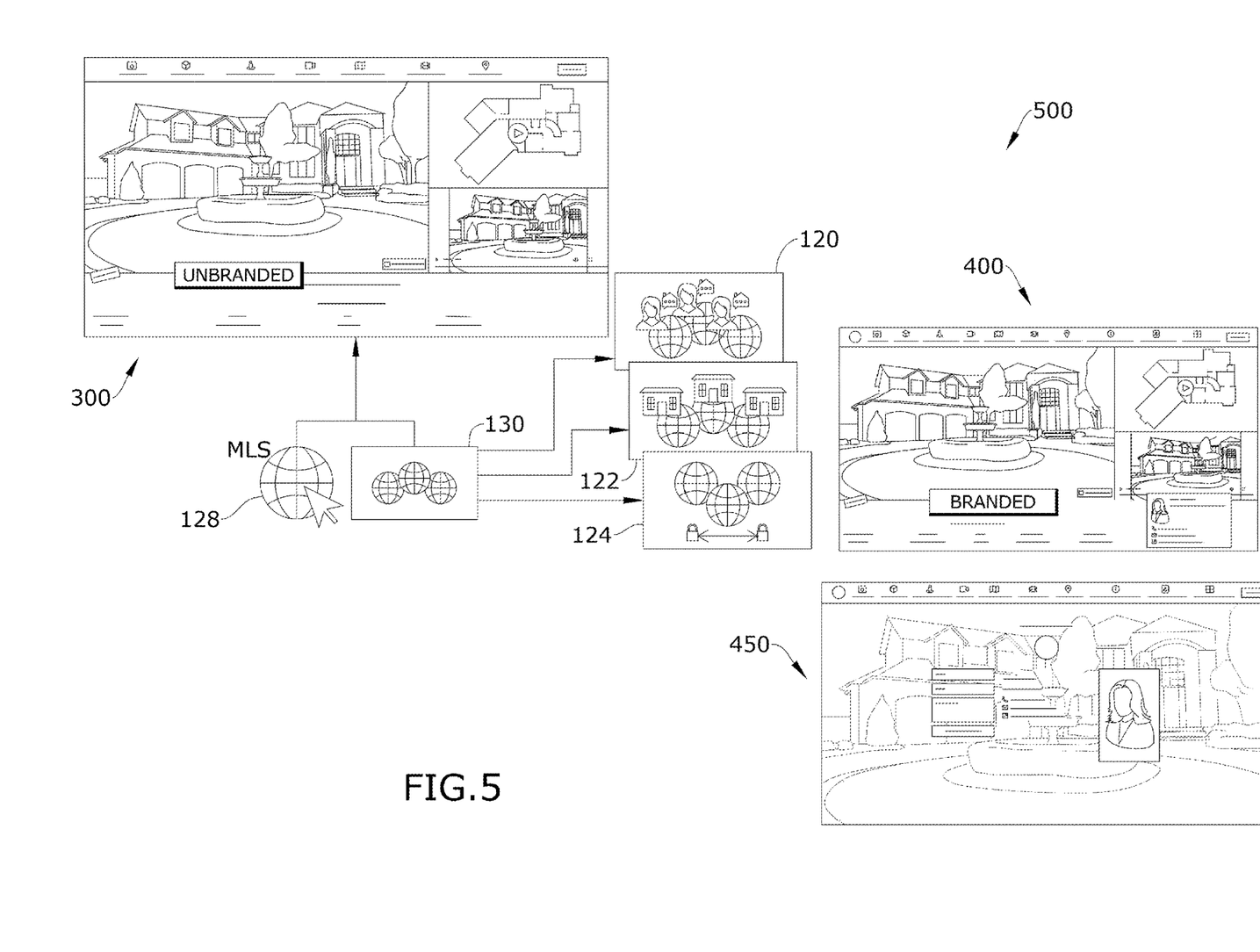
FIG. 5 conceptually illustrates conversion of the unbranded virtual tour of a real estate listing to the branded virtual tour of the real estate listing and demonstrates a lead capture input form of the post-conversion branded virtual tour in some embodiments.

Turning to another example, FIG. 5 conceptually illustrates a conversion schematic 500 for converting an unbranded version of a virtual tour 300 of a real estate listing to a branded version of the virtual tour 400 of the real estate listing. As shown in this figure, the unbranded version of a virtual tour 300 is provided to the MLS sites 128 and also distributed to competitor websites 130, the agent website 120, the agent company website 122, and several secure public search websites 124 that are in the default list, including popular real estate web sites (e.g., Zillow, Trulia, Realtor.com, Redfin, Homes.com, etc.), all of which use the secure data transfer HTTPS protocol when displaying the listing detail page and the unbranded version of the virtual tour 300. Both versions of the virtual tour also use the secure data transfer HTTPS protocol, the key requirement in order to extract the HTTP referrer header field data in the browser request from the referring website to the destination virtual tour website.

The conversion schematic 500 shown in this figure also demonstrates a lead capture input form 450 of the post-conversion branded version of the virtual tour 400. The lead capture input form 450 is automatically displayed upon selection, by the user, of the lead capture form button 410. Alternatively, the lead capture input form 450 may be displayed as part of the other content shown on the branded virtual tour 400.

Many of the above-described features and applications are implemented as software processes that are specified as a set of instructions recorded on a computer readable storage medium (also referred to as computer readable medium or machine readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 6:
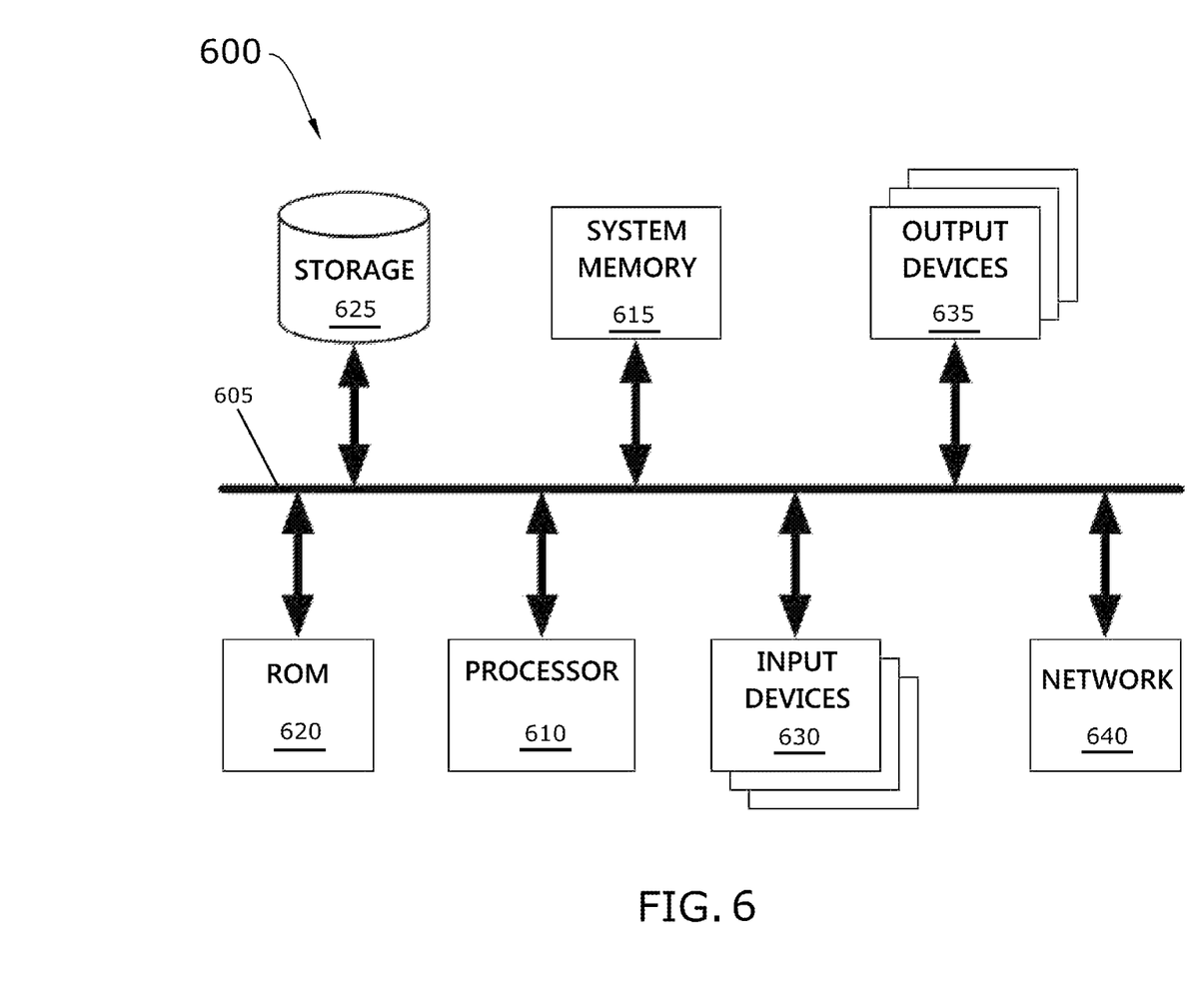
FIG. 6 conceptually illustrates an electronic system with which some embodiments of the invention are implemented.

FIG. 6 conceptually illustrates an electronic system 600 with which some embodiments of the invention are implemented. The electronic system 600 may be a computer, phone, PDA, or any other sort of electronic device. Such an electronic system includes various types of computer readable media and interfaces for various other types of computer readable media. Electronic system 600 includes a bus 605, processing unit(s) 610, a system memory 615, a read-only 620, a permanent storage device 625, input devices 630, output devices 635, and a network 640.

The bus 605 collectively represents all system, peripheral, and chipset buses that communicatively connect the numerous internal devices of the electronic system 600. For instance, the bus 605 communicatively connects the processing unit(s) 610 with the read-only 620, the system memory 615, and the permanent storage device 625.

From these various memory units, the processing unit(s) 610 retrieves instructions to execute and data to process in order to execute the processes of the invention. The processing unit(s) may be a single processor or a multi-core processor in different embodiments.

The read-only-memory (ROM) 620 stores static data and instructions that are needed by the processing unit(s) 610 and other modules of the electronic system. The permanent storage device 625, on the other hand, is a read-and-write memory device. This device is a non-volatile memory unit that stores instructions and data even when the electronic system 600 is off. Some embodiments of the invention use a mass-storage device (such as a magnetic or optical disk and its corresponding disk drive) as the permanent storage device 625.

Other embodiments use a removable storage device (such as a floppy disk or a flash drive) as the permanent storage device 625. Like the permanent storage device 625, the system memory 615 is a read-and-write memory device. However, unlike storage device 625, the system memory 615 is a volatile read-and-write memory, such as a random access memory. The system memory 615 stores some of the instructions and data that the processor needs at runtime. In some embodiments, the invention's processes are stored in the system memory 615, the permanent storage device 625, and/or the read-only 620. For example, the various memory units include instructions for processing appearance alterations of displayable characters in accordance with some embodiments. From these various memory units, the processing unit(s) 610 retrieves instructions to execute and data to process in order to execute the processes of some embodiments.

The bus 605 also connects to the input and output devices 630 and 635. The input devices enable the user to communicate information and select commands to the electronic system. The input devices 630 include alphanumeric keyboards and pointing or cursor control devices. The output devices 635 display images generated by the electronic system 600. The output devices 635 include printers and display devices, such as cathode ray tubes (CRT) or liquid crystal displays (LCD). Some embodiments include a touchscreen that functions as both an input and output device.

Finally, as shown in FIG. 6, bus 605 also couples electronic system 600 to a network 640 through a network adapter (not shown). In this manner, the computer can be a part of a network of computers (such as a local area network ("LAN"), a wide area network ("WAN"), or an Intranet), or a network of networks (such as the Internet). Any or all components of electronic system 600 may be used in conjunction with the invention.

These functions described above can be implemented in digital electronic circuitry, in computer software, firmware or hardware. The techniques can be implemented using one or more computer program products. Programmable processors and computers can be packaged or included in mobile devices. The processes and logic flows may be performed by one or more programmable processors and by sets of programmable logic circuitry. General and special purpose computing and storage devices can be interconnected through communication networks.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the invention has been described with reference to numerous specific details, one of ordinary skill in the art will recognize that the invention can be embodied in other specific forms without departing from the spirit of the invention. For instance, FIG. 2 conceptually illustrates a process. The specific operations of the process may not be performed in the exact order shown and described. Specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

I claim:

1. A non-transitory computer readable medium storing a program which, when executed by a processor of a computing device, dynamically converts an unbranded virtual tour of a real estate listing into a branded virtual tour of the real estate listing enhanced with contracted marketing agent branding, contact information, and other marketing information, said program comprising sets of instructions for:

receiving profile data that is entered, by one of an automatic process from a data source that is pre-populated with profile information of the contracted marketing agent and a manual data entry process, wherein the data source comprises one of a data feed and a database, wherein, when the received profile data is entered by the automatic process, the data source automatically inputs the profile information of the contracted marketing agent as profile data upon selection of an edit function from a computing device of the contracted marketing agent for a virtual tour associated with a property related to a property marketing purpose comprising one of a property for sale, a property for lease, a property for rent, and a property for promotion;

configuring a default website list comprising named website list entries associated with popular real estate websites that support secure hypertext transfer protocol (HTTPS) for links to property websites and the virtual tour associated with the property related to the property marketing purpose;

receiving web site profile data input from the computing device of the contracted marketing agent, said website profile data input comprising one or more other websites not included in the default website list;

receiving, from the computing device of the contracted marketing agent by way of one of manual input of the contracted marketing agent and an automated process, an unbranded virtual tour link corresponding to a particular universal resource location (URL) address into a multiple listing service (MLS) site for distribution to other websites for viewing by anyone, wherein the unbranded virtual tour link corresponding to the particular URL address is distributed by the MLS site to a plurality of real estate listing websites that display real estate listings as part of an MLS data feed, wherein the plurality of real estate listing websites comprise the popular real estate websites in the default website list, wherein the particular URL address distributed to the plurality of real estate listing websites is an identical URL address as the particular URL address for all websites ("the same particular URL address");

capturing referring website information in an HTTP referrer header field of an HTTPS request that is triggered based on a user selection of the unbranded virtual tour link at a particular referring website in the plurality of real estate listing websites that display real estate listings as part of the MLS data feed, said referring website information including a referring website identity and a referring website URL address;

determining whether the referring website identity corresponds to at least one of a named website list entry in the default website list and the website profile data;

reading the default website list and the website profile data to compare with the referring website identity;

determining whether the referring website identity corresponds to a branded conversion website comprising at least one of a named website list entry in the default website list and the website profile data, wherein the particular referring website at the referring website URL address is configured to automatically and dynamically convert the unbranded virtual tour with the link corresponding to the particular URL address into a branded virtual tour with the link corresponding to the same particular URL address when the referring website identity corresponds to the branded conversion website, wherein the branded conversion website is configured to dynamically convert the unbranded virtual tour with the link corresponding to the particular URL address into the branded virtual tour with the link corresponding to the same particular URL address and determine whether to apply a particular branding style associated with a particular popular real estate website that corresponds to a particular named website list entry in the default website list to the branded virtual tour accessible at the same particular URL address when the referring website identity does not correspond to the website profile data, wherein the particular branding style, when applied to the branded virtual tour, comprises one of (i) a first branding style associated with a first popular real estate website that corresponds to a first named website list entry in the default website list when the referring website identity corresponds to the first named website list entry in the default website list and (ii) a second branding style associated with a second popular real estate website that corresponds to a second named website list entry in the default website list when the referring website identity corresponds to the second named website list entry in the default website list, wherein when the particular branding style is determined not to apply to the automatic conversion of the unbranded virtual tour into the branded virtual tour, the conversion of the unbranded virtual tour to the branded virtual tour only applies the contracted marketing agent branding, contact information, and other marketing information of the contracted marketing agent;

dynamically converting the unbranded virtual tour with the link corresponding to the particular URL address into the branded virtual tour with the link corresponding to the same particular URL address when the referring website identity corresponds to the branded conversion website; and displaying the branded virtual tour with the contracted marketing agent branding, contact information, and other marketing information of the contracted marketing agent and, when the referring website identity does not correspond to the website profile data, the contracted marketing agent branding, contact information, and other marketing information of the contracted marketing agent and, when applied during the conversion, the particular branding style associated with the particular popular real estate website, wherein the unbranded virtual tour at the same particular URL address is displayed when no conversion to the branded virtual tour occurs from other websites not in the plurality of real estate listing websites.

2. The non-transitory computer readable medium of claim 1, wherein the received profile data comprises the contracted marketing agent branding, contact information, and other marketing information of the contracted marketing agent.

3. The non-transitory computer readable medium of claim 2, wherein the contracted marketing agent branding, contact information, and other marketing information of the contracted marketing agent comprises a name, a phone number, a website address, an email address, and a social media profile.

4. The non-transitory computer readable medium of claim 1, wherein the named website list entries in the default website list are configured to convert an unbranded version of the virtual tour associated with the property for the property marketing purpose into a branded version of the virtual tour associated with the property for the property marketing purpose when an authorized user accesses a link with the same particular URL address to the virtual tour associated with the property for the property marketing purpose, wherein the branded version of the virtual tour dynamically converted from the unbranded version of the virtual tour at same particular URL address comprises the particular branding style associated with the particular popular real estate website that corresponds to the particular named website list entry in the default website list.

5. The non-transitory computer readable medium of claim 4, wherein the other web sites are input by the contracted marketing agent to convert the unbranded version of the virtual tour associated with the property for the property marketing purpose into the branded version of the virtual tour associated with the property for the property marketing purpose when the authorized user accesses the virtual tour associated with the property for the property marketing purpose via secure HTTPS link posted on each of the other websites.

6. The non-transitory computer readable medium of claim 1, wherein the program further comprises a set of instructions for providing leads, by a lead capture subsystem, into a lead capture management system associated with the contracted marketing agent.

7. The non-transitory computer readable medium of claim 1, wherein each URL address link to the virtual tour supports secure data transfer over HTTPS by a digital certificate that employs at least one of secure sockets layer (SSL) and transport layer security (TLS) to enable secure encrypted communications between a site associated with the same particular URL address link to the virtual tour and any referring site.

8. The non-transitory computer readable medium of claim 1, wherein the branded virtual tour comprises a lead capture form button which, when selected by a user viewing the branded virtual tour, visually outputs a lead capture form.

9. The non-transitory computer readable medium of claim 8, wherein the user contacts the agent by completing the lead capture form visually output in the branded virtual tour.

10. The non-transitory computer readable medium of claim 1, wherein the program further comprises a set of instructions for displaying the unbranded virtual tour when the referring website identity does not correspond to a website configured to convert the unbranded virtual tour into the branded virtual tour.

* * * * *